United States Patent
Cai et al.

(10) Patent No.: US 12,489,585 B2
(45) Date of Patent: Dec. 2, 2025

(54) MESSAGE TRANSMISSION METHOD AND APPARATUS

(71) Applicant: HUAWEI TECHNOLOGIES CO., LTD., Guangdong (CN)

(72) Inventors: Lin Cai, Victoria (CA); Jianping Pan, Victoria (CA); Pu Yuan, Shenzhen (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 425 days.

(21) Appl. No.: 17/848,653

(22) Filed: Jun. 24, 2022

(65) Prior Publication Data

US 2022/0329392 A1    Oct. 13, 2022

Related U.S. Application Data

(63) Continuation of application No. PCT/CN2019/128855, filed on Dec. 26, 2019.

(51) Int. Cl.
*H04L 12/26* (2006.01)
*H04L 5/00* (2006.01)
(Continued)

(52) U.S. Cl.
CPC ............. *H04L 5/0055* (2013.01); *H04W 4/70* (2018.02); *H04W 4/40* (2018.02)

(58) Field of Classification Search
None
See application file for complete search history.

(56) References Cited

U.S. PATENT DOCUMENTS 10,028,198 B2 * 7/2018 Fitzek ................ H04W 84/18
2013/0315139 A1 * 11/2013 Abraham ............ H04L 1/1867
370/328
(Continued)

FOREIGN PATENT DOCUMENTS

CN    102340829 A    2/2012
CN    103684715 A    3/2014
(Continued)

OTHER PUBLICATIONS

Samsung, "Discussion on Unicast, Groupcast and Broadcast for NR V2X," 3GPP TSG RAN WG1 Meeting #94bis, R1-1810867, Chengdu, China, Oct. 8-12, 2018, 6 pages.
(Continued)

*Primary Examiner* — Zewdu A Beyen
(74) *Attorney, Agent, or Firm* — Fish & Richardson P.C.

(57) ABSTRACT

The disclosure provides message transmission methods and apparatuses, which can be used in various communication systems, for example, a V2X communication system, an LTE-V communication system, a V2V communication system, an IoV communication system, an MTC system, an IoT communication system, an LTE-M communication system, and a M2M communication system. One example method includes that a second terminal device receives a first message, where the first message is a broadcast message from a first terminal device, and the first message includes first data. The second terminal device receives a reception failure message for the first message, where the reception failure message for the first message is a broadcast message from a third terminal device, and the second terminal device broadcasts a second message, where the second message includes the first data.

20 Claims, 7 Drawing Sheets

(51) Int. Cl.
*H04W 4/70* (2018.01)
*H04W 4/40* (2018.01)

(56) References Cited

U.S. PATENT DOCUMENTS

2018/0091265 A1    3/2018  Liu et al.
2020/0100048 A1*   3/2020  Wu ...................... H04L 1/1829
2020/0322839 A1*  10/2020  Nguyen ................ H04W 28/04

FOREIGN PATENT DOCUMENTS

CN    106254044 A    12/2016
CN    104521170 B    11/2018
WO    2018059282 A1   4/2018

OTHER PUBLICATIONS

Extended European Search Report in European Appln No. 19957113.4, dated Nov. 24, 2022, 7 pages.
PCT International Search Report and Written Opinion issued in International Application No. PCT/CN2019/128855 on Jun. 19, 2020, 17 pages (with English translation).

* cited by examiner

MESSAGE TRANSMISSION METHOD AND APPARATUS

CROSS-REFERENCE TO RELATED APPLICATIONS

This application is a continuation of International Application No. PCT/CN2019/128855, filed on Dec. 26, 2019, the disclosure of which is hereby incorporated by reference in its entirety.

TECHNICAL FIELD

This application relates to the field of wireless communication technologies, and in particular, to a message transmission method and an apparatus.

BACKGROUND

In a conventional message retransmission solution, when a network device (for example, a base station) receives an acknowledgement (acknowledgement, ACK) message from user equipment (user equipment, UE), the base station does not trigger retransmission; and when the base station receives a negative acknowledgement (negative acknowledgement, NACK) message from the UE, the base station triggers retransmission. A time point at which the UE feeds back the ACK message or the NACK message is indicated by the base station. Specifically, the base station configures a feedback time index table for each UE using a radio resource control (radio resource control, RRC) message. When UE needs to perform feedback, the base station indicates a specific index in the table using downlink control information (downlink control information, DCI) to configure a feedback time point for the UE. The foregoing solution has disadvantages of high signaling overheads and low time-frequency resource utilization.

In future Internet of vehicles, many higher-layer applications, for example, intra-group multimedia content sharing, intra-group collaborative transmission, and group voting in a blockchain network, need to group vehicles. An intra-group message retransmission solution in current Internet of vehicles is basically the same as a conventional message retransmission solution. In the intra-group message retransmission solution of the Internet of vehicles, it is assumed that UE 1 to UE 3 belong to a same multicast group, and the UE 1 broadcasts or multicasts a message 1. If the UE 1 receives a NACK message from the UE 2, the UE 1 retransmits the message 1 for the UE 2. Therefore, the base station needs to additionally allocate, to the UE 1, a resource used to retransmit the message 1. This results in high signaling overheads and low time-frequency resource utilization.

SUMMARY

Embodiments of this application provide a message transmission method and an apparatus, which can be used in various communication systems, for example, a V2X communication system, a long term evolution-vehicle (long term evolution-vehicle, LTE-V) communication system, a vehicle-to-vehicle (vehicle-to-vehicle, V2V) communication system, an Internet of vehicles communication system, a machine type communication (machine type communication, MTC) system, an Internet of things (Internet of things, IoT) communication system, a long term evolution-machine (long term evolution-machine, LTE-M) communication system, or a machine-to-machine (machine-to-machine, M2M) communication system, to resolve problems of high signaling overheads and low time-frequency resource utilization.

According to a first aspect, this application provides a message transmission method. The method includes: A second terminal device receives a first message, where the first message is a broadcast message from a first terminal device, and the first message includes first data. The second terminal device receives a reception failure message for the first message, where the reception failure message for the first message is a broadcast message from a third terminal device. The second terminal device broadcasts a second message, where the second message includes the first data.

According to the method, no additional resources need to be allocated for retransmission, and instead, to-be-retransmitted data is retransmitted by another terminal device. This can reduce retransmission overheads while ensuring reliability.

In a possible design, the first terminal device, the second terminal device, and the third terminal device belong to a same multicast group.

According to this design, collaborative retransmission among terminal devices in the multicast group can be implemented.

In a possible design, the second message further includes second data.

According to this design, the to-be-retransmitted data is retransmitted by another terminal device during initial transmission.

In a possible design, the second message includes a linear combination constituted by the first data and the second data.

According to this design, reliability of messages can be ensured, and a simple system design is provided.

In a possible design, the method further includes: The second terminal device receives a fourth message, where the fourth message is a broadcast message from a fourth terminal device, and the fourth message includes the first data. The second terminal device receives a reception failure message for the fourth message, where the reception failure message for the fourth message is a broadcast message from the third terminal device.

According to this design, when determining that another terminal device has retransmitted the first data and the third terminal device fails to receive the retransmitted first data, the second terminal device retransmits the first data for the third terminal device again.

According to a second aspect, this application provides a message transmission method. The method includes: A third terminal device broadcasts a reception failure message for a first message, where the first message is a broadcast message from a first terminal device, and the first message includes first data. The third terminal device receives a second message, where the second message is a broadcast message from a second terminal device, and the second message includes the first data.

According to the method, no additional resources need to be allocated for retransmission, and instead, to-be-retransmitted data is retransmitted by another terminal device. This can reduce retransmission overheads while ensuring reliability.

In a possible design, the first terminal device, the second terminal device, and the third terminal device belong to a same multicast group.

According to this design, collaborative retransmission among terminal devices in the multicast group can be implemented.

In a possible design, the second message further includes second data.

According to this design, the to-be-retransmitted data is retransmitted by another terminal device during initial transmission.

In a possible design, the second message includes a linear combination constituted by the first data and the second data.

According to this design, reliability of messages can be ensured, and a simple system design is provided.

In a possible design, the method further includes: The third terminal device broadcasts a reception failure message for the second message. The third terminal device receives a fifth message, where the fifth message is a broadcast message from a fifth terminal device, and the fifth message includes the first data.

According to this design, when determining a failure in receiving the second message, the third terminal device receives the first data retransmitted by another terminal device for the third terminal device.

According to a third aspect, this application provides a message transmission method. The method includes: A first terminal device sends a first message to a second terminal device, where the first message includes first data. The first terminal device receives a reception failure message from the second terminal device for the first message. The first terminal device sends a second message to the second terminal device, where the second message includes the first data and second data.

According to this design, when determining that the second terminal device fails to receive the first data, the first terminal device may initially transmit the second data while retransmitting the first data for the second terminal device. Therefore, no additional resource needs to be allocated for retransmission, and to-be-retransmitted data can be retransmitted during initial transmission of data. This can reduce retransmission overheads while ensuring reliability, and improve resource utilization.

In a possible design, the second message includes a linear combination constituted by the first data and the second data.

According to this design, reliability of messages can be ensured, and a simple system design is provided.

According to a fourth aspect, this application provides a message transmission method. The method includes:

A second terminal device sends a reception failure message to a first terminal device for a first message, where the first message is a message from the first terminal device, and the first message includes first data. The second terminal device receives a second message from the first terminal device, where the second message includes the first data and second data.

According to this design, when determining a failure in receiving the first data from the first terminal device, the second terminal device may continue to receive the second message from the first terminal device after feeding back the reception failure message, where the second message includes the first data and the second data. Therefore, no additional resource needs to be allocated for retransmission, and to-be-retransmitted data can be retransmitted during initial transmission of data. This can reduce retransmission overheads while ensuring reliability, and improve resource utilization.

In a possible design, the second message includes a linear combination constituted by the first data and the second data.

According to this design, reliability of messages can be ensured, and a simple system design is provided.

According to a fifth aspect, an embodiment of this application provides a communication apparatus. The apparatus may be a terminal device, or may be a chip in a terminal device. The apparatus may include a processing unit, a sending unit, and a receiving unit. It should be understood that the sending unit and the receiving unit herein may alternatively be a transceiver unit. When the apparatus is a terminal device, the processing unit may be a processor, and the sending unit and the receiving unit may be a transceiver. The terminal device may further include a storage unit, and the storage unit may be a memory. The storage unit is configured to store instructions, and the processing unit executes the instructions stored in the storage unit, so that the terminal device is enabled to perform the method according to any one of the first aspect or the possible designs of the first aspect, the method according to any one of the second aspect or the possible designs of the second aspect, the method according to any one of the third aspect or the possible designs of the third aspect, or the method according to any one of the fourth aspect or the possible designs of the fourth aspect. When the apparatus is a chip in a terminal device, the processing unit may be a processor, and the sending unit and the receiving unit may be input and output interfaces, pins, circuits, or the like. The processing unit executes instructions stored in a storage unit, so that the chip is enabled to perform the method according to any one of the first aspect or the possible designs of the first aspect, the method according to any one of the second aspect or the possible designs of the second aspect, the method according to any one of the third aspect or the possible designs of the third aspect, or the method according to any one of the fourth aspect or the possible designs of the fourth aspect. The storage unit is configured to store instructions. The storage unit may be a storage unit (for example, a register or a cache) in the chip, or may be a storage unit (for example, a read-only memory or a random access memory) located outside the chip and in the terminal device.

According to a sixth aspect, an embodiment of this application further provides a computer-readable storage medium. The computer-readable storage medium stores a computer program. When the computer program is run on a computer, the computer is enabled to perform the method according to any one of the first aspect to the fourth aspect.

According to a seventh aspect, an embodiment of this application further provides a computer program product including a program. When the computer program product runs on a computer, the computer is enabled to perform the method according to any one of the first aspect to the fourth aspect.

According to an eighth aspect, an embodiment of this application further provides a communication apparatus, including a processor and a memory. The memory is configured to store computer-executable instructions, and the processor is configured to execute the computer-executable instructions stored in the memory, to enable the communication apparatus to perform the method according to any one of the first aspect to the fourth aspect.

According to a ninth aspect, an embodiment of this application further provides a communication apparatus, including a processor and an interface circuit. The interface circuit is configured to receive code instructions and transmit the code instructions to the processor, and the processor runs the code instructions, to perform the method according to any one of the first aspect to the fourth aspect.

According to a tenth aspect, an embodiment of this application further provides a communication system. The communication system includes at least three terminal devices, which belong to a same multicast group. The terminal devices in the multicast group perform the method according to any one of the first aspect and the second aspect.

In a possible design, the communication system further includes a network device. The network device configures resources used by terminal devices in the multicast group to transmit data and resources used by terminal devices in the multicast group to feed back reception failure messages.

According to an eleventh aspect, an embodiment of this application further provides a communication system. The communication system includes two terminal devices, and the two terminal devices perform the method according to any one of the third aspect and the fourth aspect.

In a possible design, the communication system further includes a network device. The network device configures resources used by the two terminal devices to transmit data and resources used by the two terminal devices to feed back reception failure messages.

DESCRIPTION OF EMBODIMENTS

Figure 1:
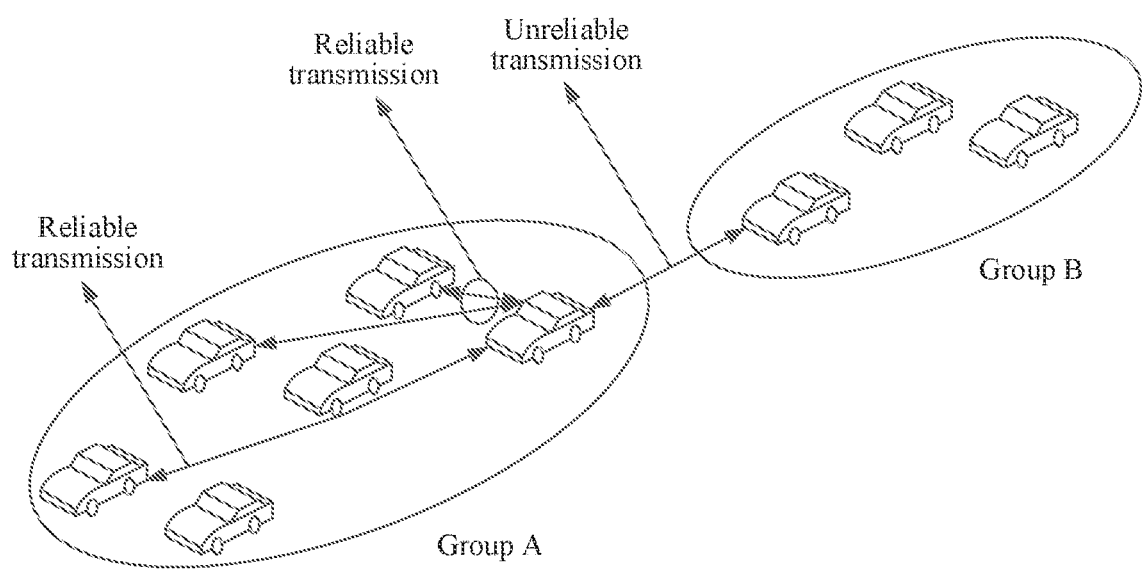
FIG. 1 is a scenario in which a plurality of terminal devices constitute a user group in an NR-V2X wireless communication system according to this application.

The following describes embodiments of this application with reference to the accompanying drawings.

Wireless communication technologies have undergone rapid development in the past decades, from first generation wireless communication systems based on analog communication systems, 2G wireless communication systems represented by global system for mobile communication (global system for mobile communication, GSM), and 3G wireless communication systems represented by wideband code division multiple access (wideband code division multiple access, WCDMA), to 4G wireless communication systems represented by long term evolution (long term evolution, LTE) communication systems, which have been widely commercially used in the world and have achieved great success. Services supported by the wireless communication systems have also developed from voice and SMS services to currently supported wireless high-speed data communication services. In addition, a quantity of wireless connections worldwide is continuously increasing at a high speed, and a large quantity of various new wireless service types also emerge, for example, the Internet of things and autonomous driving. These services impose higher requirements on next generation wireless communication systems, namely, new radio (new radio, NR) communication systems.

NR-vehicle to infrastructure/vehicle/pedestrian (NR-vehicle to infrastructure/vehicle/pedestrian, NR-V2X) defines two air interfaces: a UMTS terrestrial radio access network user equipment (UTRAN UE, Uu) interface, which defines a communication protocol between UE and a base station; and a proximity communication (proximity communication, PC) 5 interface, which defines a communication protocol between UEs. The Uu interface defines uplink and downlink transmission protocols similar to those of NR. Uplink and downlink transmission protocols of NR are basically inherited in terms of frequency band allocation, bandwidth, frame structures, transmission modes, and signaling definitions, and some V2X-dedicated signaling is added on this basis. The PC5 interface may have different designs in terms of the foregoing aspects. For example, in terms of frequency bands, NR uplink frequency bands may be multiplexed, or unlicensed frequency bands may be used; dedicated frame structures and pilot designs are used; and beam management and multiple-input multiple-output (multiple-input multiple-output, MIMO) may be simplified based on designs of NR. A link set up on the PC5 interface is referred to as a sidelink (sidelink). In a sidelink, two behavior modes: mode-1 (mode-1) and mode-2 (mode-2), are specified for UEs. A difference between the mode-1 and the mode-2 lies in that resource scheduling for UEs in the mode-1 is performed by a base station, and resource scheduling for UEs in the mode-2 is performed by UE.

A network element in this application is mainly a terminal device (terminal device). The terminal device may also be referred to as a terminal (terminal), user equipment (UE), a mobile station (mobile station, MS), a mobile terminal (mobile terminal, MT), or the like. The terminal device may be a mobile phone (mobile phone), a tablet computer (Pad), a computer with a wireless transceiver function, a virtual reality (virtual reality, VR) terminal device, an augmented reality (Augmented Reality, AR) terminal device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like.

This application is mainly applied to a scenario in which a plurality of terminal devices constitute a user group in an NR-V2X wireless communication system, as shown in FIG. 1. There are two user groups in FIG. 1, and terminal devices herein are vehicles. The vehicles may be grouped based on geographical locations or service types. In addition, an existing protocol does not specify a specific vehicle grouping solution, especially a manner of collaboration between UEs in a group. For example, a center is introduced to control UEs for collaboration, or decentralized UE collaboration is implemented. The manner of collaboration between UEs in a group is not limited in this application.

It should be understood that broadcast in the following embodiments of this application may mean that broadcast is performed for all terminal devices or terminal devices in a group. In the latter case, the broadcast may also be understood as multicast.

Embodiment 1

Figure 2:
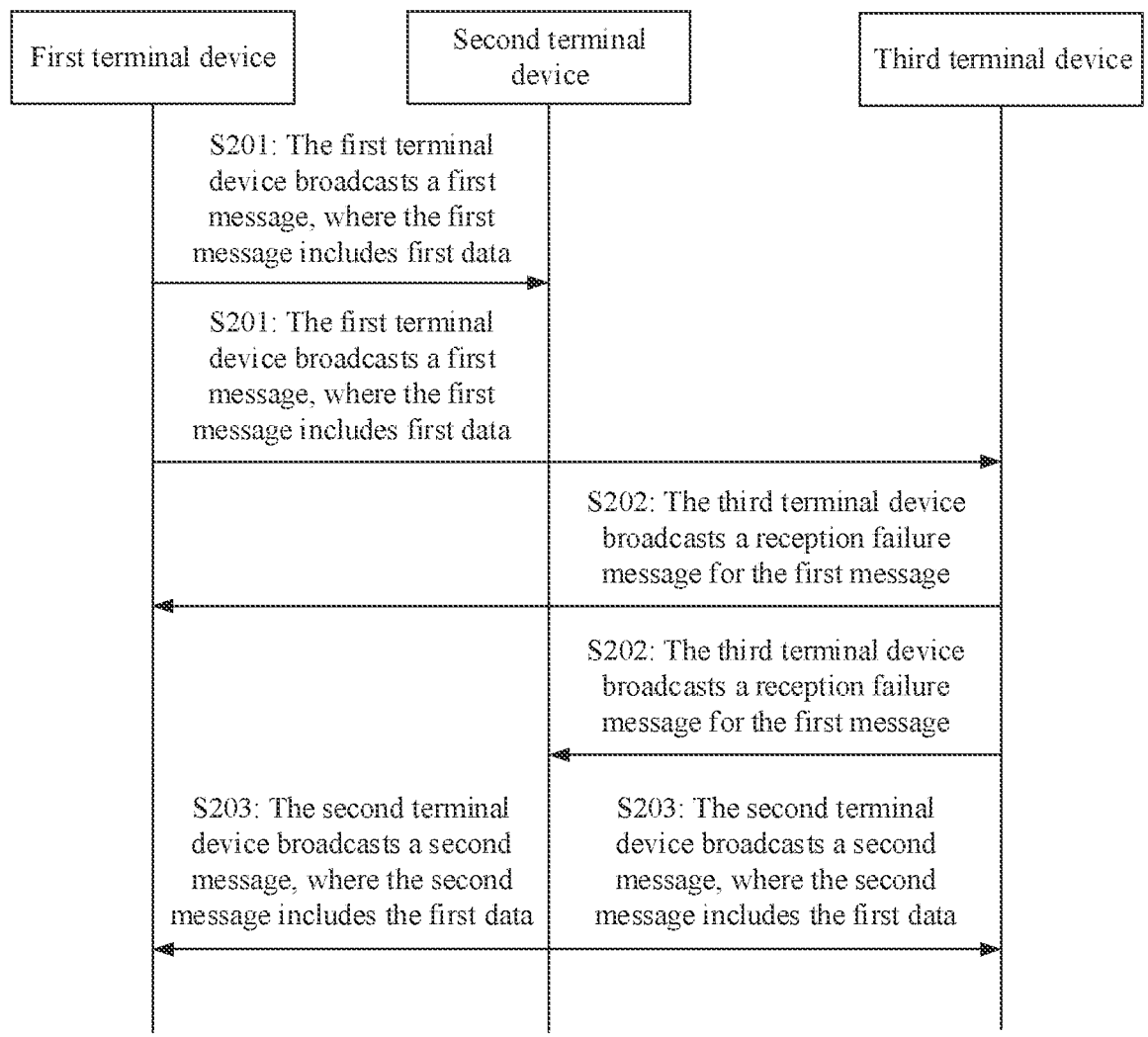
FIG. 2 is a first overview flowchart of a message transmission method according to this application.

As shown in FIG. 2, an embodiment of this application provides a message transmission method, to resolve problems of high signaling overheads and low time-frequency resource utilization. The method includes:

S201: A first terminal device broadcasts a first message, where the first message includes first data. The first data is data initially transmitted by the first terminal device. A second terminal device receives the first message broadcast by the first terminal device. A third terminal device fails to receive the first message.

In a possible design, the first terminal device, the second terminal device, and the third terminal device belong to a same multicast group. The multicast group may also be referred to as a user group. This is not limited in this application. The first terminal device, the second terminal device, and the third terminal device may broadcast messages in the following order: the first terminal device, the second terminal device, and the third terminal device; or the first terminal device, the third terminal device, and the second terminal device. Terminal devices in the multicast group may broadcast messages in a preconfigured order, or the order is specified in a protocol. Terminal devices in the multicast group may broadcast messages in turn in a plurality of rounds in a message broadcasting order, or periodically broadcast messages in one or more rounds in a message broadcasting order, or broadcast messages in one or more rounds in a message broadcasting order when a preset trigger condition is met. This is not limited in this application.

A time-frequency resource used by the first terminal device to broadcast a message, a time-frequency resource used by the second terminal device to broadcast a message, and a time-frequency resource used by the third terminal device to broadcast a message may be time division multiplexed. A time-frequency resource used to broadcast a reception failure message for feedback for the message broadcast by the first terminal device, a time-frequency resource used to broadcast a reception failure message for feedback for the message broadcast by the second terminal device, and a time-frequency resource used to broadcast a reception failure message for feedback for the message broadcast by the third terminal device may be time division multiplexed. In addition, a network device can also configure a code domain resource used to broadcast a reception failure message for feedback for the message broadcast by the first terminal device, a code domain resource used to broadcast a reception failure message for feedback for the message broadcast by the second terminal device, and a code domain resource used to broadcast a reception failure message for feedback for the message broadcast by the third terminal device. For example, the code domain resource used to broadcast a reception failure message for feedback for the message broadcast by the first terminal device may be a special pilot code on a common channel. The common channel is a channel used by each terminal device to feed back a reception success message and/or a reception failure message.

For example, a multicast group includes UE 1 to UE 3, and the UE 1 to the UE 3 broadcast messages in a numerical order: the UE 1, the UE 2, and the UE 3. For example, the UE 1, the UE 2, and the UE 3 may broadcast messages in turn, or the UE 1, the UE 2, and the UE 3 broadcast messages in turn every preset cycle.

It should be understood that a quantity of terminal devices in a multicast group may be greater than or equal to 3. When the quantity of terminal devices in a multicast group is greater than 3, terminal devices that successfully receive the first message may further include another terminal device, and terminal devices that fail to receive the first message may also include another terminal device.

For example, a multicast group includes UE 1 to UE 5, and the UE 1 to the UE 5 broadcast messages in a numerical order. The UE 1 broadcasts a message 1, and the message 1 includes data of the UE 1. The UE 2 and the UE 4 have received the message 1, that is, the UE 2 and the UE 4 successfully receive message 1. The UE 3 and the UE 5 have not received the message 1, that is, the UE 3 and the UE 5 fails to receive the message 1.

S202: The third terminal device broadcasts a reception failure message for the first message. Accordingly, the first terminal device receives the reception failure message broadcast by the third terminal device for the first message, and the second terminal device receives the reception failure message broadcast by the third terminal device for the first message.

It should be understood that the second terminal device that successfully receives the first message may not feed back a reception success message, or may feed back a reception success message. This is not limited in this application. In the following example, it is assumed that a terminal device that successfully receives a message does not feed back a reception success message.

S203: The second terminal device broadcasts a second message, where the second message includes the first data. Accordingly, the third terminal device receives the second message broadcast by the second terminal device, and the first terminal device receives the second message broadcast by the second terminal device.

In a possible design, the second message further includes second data. The second data is data initially transmitted by the second terminal device. The second message includes a linear combination constituted by the first data and the second data. For example, the second message may be two linear combinations constituted by the first data and the second data.

Before the second terminal device broadcasts the second message, the second terminal device may determine, based on a retransmission queue maintained by the second terminal device, data to be retransmitted.

In an example, when the second terminal device receives the reception failure message broadcast by the third terminal device for the first message, the second terminal device may store the first data in the retransmission queue. When it is the turn for the second terminal device to broadcast the second message, the second terminal device determines, based on the retransmission queue, that the second message includes the first data.

Further, if the second terminal device is a terminal device that first retransmits the first data for the third terminal device, after the second terminal device broadcasts the second message, if the second terminal device has not received a reception failure message broadcast by the third terminal device for the second message, it indicates that the third terminal device has received the first data, and the second terminal device may update the retransmission queue, to be specific, the second terminal device deletes the first data from the retransmission queue. If the second terminal device has received a reception failure message broadcast by the third terminal device for the second message, the second terminal device may keep the retransmission queue unchanged, or when the second message further includes the second data, the second terminal device may update the retransmission queue, and the second data is added to the retransmission queue.

If the second terminal device is not a terminal device that first retransmits the first data for the third terminal device, it is assumed that the multicast group further includes a fourth terminal device, and the fourth terminal device broadcasts a message after the first terminal device but before the second terminal device. If the fourth terminal device has received the first message, before the second terminal device broadcasts the second message, the fourth terminal device broadcasts a fourth message, and the fourth message includes the first data. If the second terminal device has received the fourth message and the second terminal device has received a reception failure message broadcast by the third terminal device for the fourth message, the second terminal device broadcasts the second message, where the second message includes the first data. It should be understood that if the fourth message further includes fourth data, the second terminal device updates the retransmission queue, and the fourth data is added to the retransmission queue. The second message includes the fourth data and the first data, and the fourth data is data initially transmitted by the fourth terminal device. If the second terminal device has received the fourth message but the second terminal device has not received a reception failure message broadcast by the third terminal device for the fourth message, it indicates that the third terminal device has received the first data, and the second terminal device broadcasts the second message, where the second message does not include the first data. Therefore, when the second terminal device determines that the third terminal device has not successfully received the first data retransmitted by another terminal device for the third terminal device, the second terminal device continues to retransmit the first data for the third terminal device. When the second terminal device determines that the third terminal device has successfully received the first data retransmitted by another terminal device for the third terminal device, the second terminal device may not need to retransmit the first data for the third terminal device. Accordingly, the second terminal device updates the retransmission queue, and deletes the first data from the retransmission queue.

Similarly, it is assumed that the multicast group further includes a fifth terminal device, and the fifth terminal device broadcasts a message after the second terminal device. If the fifth terminal device has received the first message and the fifth terminal device has received the second message, where the second message includes the first data, and the fifth terminal device has received a reception failure message broadcast by the third terminal device for the second message, the fifth terminal device broadcasts a fifth message, where the fifth message includes the first data. If the second message further includes the second data, the fifth message includes the first data and the second data. If the fifth terminal device has received the second message, where the second message includes the first data, and the fifth terminal device has not received a reception failure message broadcast by the third terminal device for the second message, the fifth terminal device broadcasts a fifth message, where the fifth message may not include the first data.

Therefore, in the foregoing design, each time the second terminal device receives a reception failure message broadcast by another terminal device for a message received by the second terminal device, the second terminal device determines whether the retransmission queue needs to be updated. If the message includes only the data to be retransmitted and the second terminal device has successfully received the data to be retransmitted, the second terminal device does not update the retransmission queue. If the message includes initially transmitted data, the second terminal device updates the retransmission queue, and stores the initially transmitted data included in the message in the retransmission queue.

To sum up, according to the method, no additional resources need to be allocated for retransmission, and instead, to-be-retransmitted data is retransmitted by another terminal device. This can reduce retransmission overheads while ensuring reliability.

The following describes the method in the embodiment shown in FIG. 2 with reference to specific examples.

Figure 3:
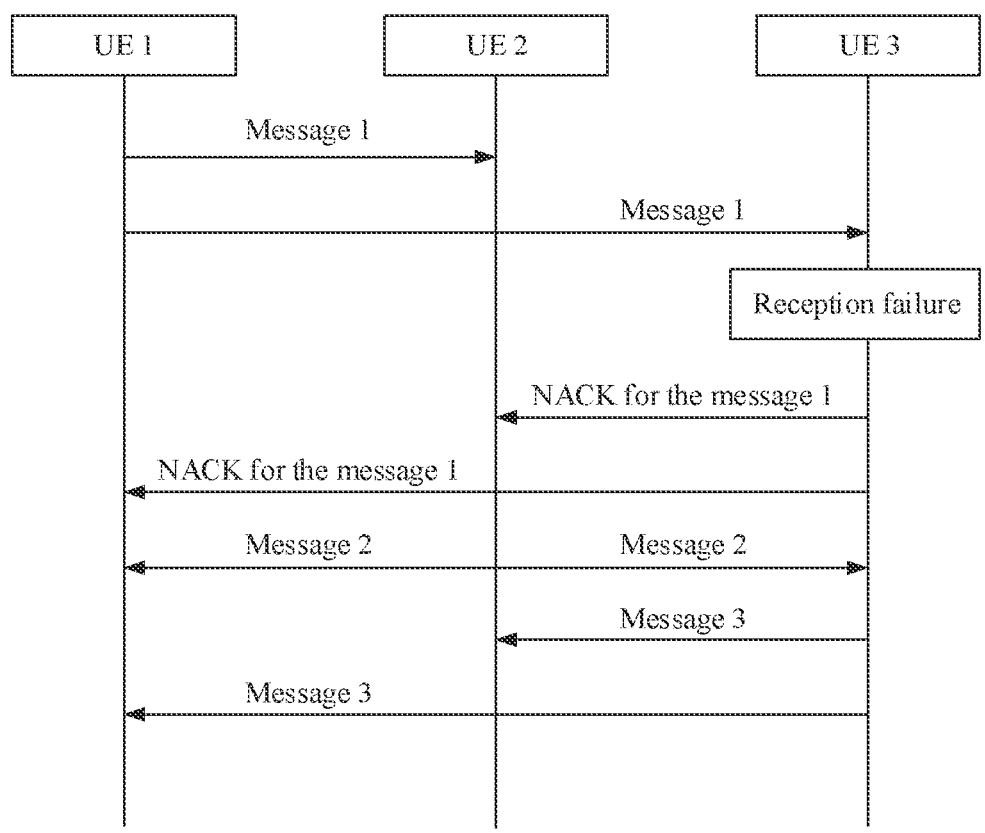
FIG. 3 is a specific flowchart for which a multicast group constituted by UE 1 to UE 3 performs a message transmission method according to this application.

Example 1: As shown in FIG. 3, a multicast group includes UE 1 to UE 3, and the UE 1 to the UE 3 broadcast messages in a numerical order.

The UE 1 broadcasts a message 1, and the UE 2 and the UE 3 are receiving UEs, where the message 1 includes data of the UE 1. In this case, the data of the UE 1 is transmitted for the first time, that is, the data of the UE 1 is initially transmitted. The UE 3 has not received the message 1, and the UE 3 broadcasts a NACK message. The UE 1 and the UE 2 receive the NACK message broadcast by the UE 3.

The UE 2 broadcasts a message 2, and the UE 1 and the UE 3 are receiving UEs, where the message 2 includes data of the UE 2 and the data of the UE 1. In this case, the data of the UE 1 is retransmitted, and the data of the UE 2 is initially transmitted, that is, the UE 2 retransmits the data of the UE 1 while broadcasting the data of the UE 2. If the UE 3 has successfully received the message 2, the UE 3 obtains the data of the UE 2 through parsing and also obtains the missing data of the UE 1.

The UE 3 broadcasts a message 3, and the UE 1 and the UE 2 are receiving UEs, where the message 3 includes data of the UE 3. The UE 1 and the UE 2 receive the message 3 broadcast by the UE 3.

Example 2: As shown in FIG. 3, a multicast group includes UE 1 to UE 4, and the UE 1 to the UE 4 broadcast messages in a numerical order.

The UE 1 broadcasts a message 1, and the UE 2 to the UE 4 are receiving UEs, where the message 1 includes data of the UE 1. In this case, the data of the UE 1 is transmitted for the first time, that is, the data of the UE 1 is initially transmitted. The UE 2 and the UE 4 have not received the message 1, and the UE 2 and the UE 4 each broadcast a NACK message. The UE 1 and the UE 3 receive the NACK messages broadcast by the UE 2 and the UE 4.

The UE 2 broadcasts a message 2, and the UE 1, the UE 3 and the UE 4 are receiving UEs, where the message 2 includes data of the UE 2. In this case, the data of the UE 2 is initially transmitted, and the UE 3 and the UE 4 have not received the message 2. The UE 3 and the UE 4 each broadcast a NACK message. The UE 1 and the UE 2 receive the NACK messages broadcast by the UE 3 and the UE 4.

The UE 3 broadcasts a message 3, and the UE 1, the UE 2, and the UE 4 are receiving UEs, where the message 3 includes data of the UE 3 and the data of the UE 1. Because the UE 3 has not received the message 2, the UE 3 cannot retransmit the data of the UE 2. The UE 4 has not received the message 3, and the UE 4 broadcasts a NACK message. The UE 1 to the UE 3 receive the NACK message broadcast by the UE 4.

The UE 4 broadcast a message 4, and the UE 1 to the UE 4 are receiving UEs, where the message 4 includes data of the UE 4. Because the UE 4 has not received the message 1, the message 2 and the message 3, the message 4 does not include data to be retransmitted. The UE 1 to the UE 3 receive the message 4 broadcast by the UE 4.

The foregoing round of message broadcasting is denoted as a first round. In a next round of message broadcasting (denoted as a second round herein), the UE 1 broadcasts a message 1. The message 1 includes data of the UE 1 in the second round, the data of the UE 1 in the first round, the data of the UE 2 in the first round, and the data of the UE 3 in the first round. Therefore, there may be a scenario in which the UE 1 retransmits data broadcast by the UE 1 in a previous round.

Example 3: A multicast group includes UE 1 to UE 5, and the UE 1 to the UE 5 broadcast messages in a numerical order.

The UE 1 broadcasts a message 1, and the UE 2 to the UE 5 are receiving UEs, where the message 1 includes data of the UE 1. In this case, the data of the UE 1 is transmitted for the first time, that is, the data of the UE 1 is initially transmitted. The UE 2 has not received the message 1, and the UE 2 broadcasts a NACK message. The UE 1 and the UE 3 to the UE 5 receive the NACK message broadcast by the UE 2.

The UE 2 broadcasts a message 2, and the UE 1 and the UE 3 to the UE 5 are receiving UEs, where the message 2 includes data of the UE 2. In this case, the data of the UE 2 is initially transmitted. The UE 5 has not received the message 2, and the UE 5 broadcasts a NACK message. The UE 1 to the UE 4 receive the NACK message broadcast by the UE 5.

The UE 3 broadcasts a message 3, and the UE 1, the UE 2, the UE 4 and the UE 5 are receiving UEs, where the message 3 includes data of the UE 3, the data of the UE 1, and the data of the UE 2. In this case, the data of the UE 3 is initially transmitted, and the data of the UE 1 and the data of the UE 2 are retransmitted, that is, the UE 3 retransmits the data of the UE 1 and the data of the UE 2 while broadcasting the data of the UE 3. If the UE 2 has successfully received the message 3, the UE 2 obtains the data of the UE 3 through parsing and also obtains the missing data of the UE 1. The UE 5 has not received the message 3, and the UE 5 broadcasts a NACK message. The UE 1 to the UE 4 receive the NACK message broadcast by the UE 5.

The UE 4 broadcasts a message 4, and the UE 1 to the UE 3 and the UE 5 are receiving UEs, where the message 4 includes data of the UE 4, the data of the UE 3, and the data of the UE 2. In this case, the data of the UE 4 is initially transmitted, and the data of the UE 2 and the data of the UE 3 are retransmitted, and the data of the UE 2 is retransmitted for the second time, that is, the UE 4 retransmits the data of the UE 3 and the data of the UE 2 while broadcasting the data of the UE 4. If the UE 5 has successfully received the message 4, the UE 5 obtains the data of the UE 4 through parsing and also obtains the missing data of the UE 2 and the missing data of the UE 3.

The UE 5 broadcasts a message 5, and the UE 1 to the UE 4 are receiving UEs, where the message 5 includes data of the UE 5. In this case, the data of the UE 5 is initially transmitted. The UE 1 to the UE 4 receive the message 5 broadcast by the UE 5. If there is a UE that has not received the message 5, the UE 1 may retransmit the data of the UE 5 in a next round of broadcasting.

For the example 3, encoding schemes of the message 3 are described with reference to examples.

Solution 1: The message 3 includes a first information element, where the first information element includes three linear combinations constituted by the data of the UE 1, the data of the UE 2, and the data of the UE 3. Coefficient vectors of the three linear combinations are linearly independent of each other, and a coefficient matrix A may be determined using the coefficient vectors of the three linear combinations. The coefficient matrix A is for parsing the message 3.

The message 3 may be represented as $$\begin{pmatrix} m3 \\ C1 \\ C2 \end{pmatrix},$$

where m3 represents the data of the UE 3, $C1 = a_{11}m3 + a_{12}m2 + a_{13}m1$, and $C2 = a_{21}m3 + a_{22}m2 + a_{23}m1$, where m1 represents the data of the UE 1 and m2 represents the data of the UE 2.

$$A = \begin{pmatrix} 1 & 0 & 0 \\ a_{11} & a_{12} & a_{13} \\ a_{21} & a_{22} & a_{23} \end{pmatrix}, \text{ and}$$

$$\begin{pmatrix} m3 \\ m2 \\ m1 \end{pmatrix} = A^{-1} \begin{pmatrix} m3 \\ C1 \\ C2 \end{pmatrix}$$

Further, the message 3 further includes a second information element, where the second information element includes indication information, or the first information element includes indication information. The indication information includes information for indicating a time-frequency resource used by the UE 1 to broadcast the message 1 and information for indicating a time-frequency resource used by the UE 2 to broadcast the message 2, and/or an identifier of the UE 1 and an identifier of the UE 2. Therefore, the indication information indicates that data to be retransmitted includes the data of the UE 1 and the data of the UE 2.

In addition, the indication information further includes a value 2, an index of the coefficient matrix A, or the coefficient matrix A. When the indication information indicates the value 2, it indicates that the UE 3 retransmits initially transmitted data broadcast by two devices. A receiving UE may store coefficient matrices respectively corresponding to a plurality of different values, determine a corresponding coefficient matrix based on the value 2 indicated by the indication information, and parse the message 3 based on the determined coefficient matrix. When the indication information indicates the index of the coefficient matrix A, a receiving UE may query, based on the index, a plurality of stored coefficient matrices, determine a coefficient matrix corresponding to the index, and parse the message 3 based on the coefficient matrix corresponding to the index. When the indication information indicates the coefficient matrix A, a receiving UE may parse the message 3 based on the coefficient matrix A indicated by the indication information.

It should be understood that when the message 3 does not include data to be retransmitted, $a_{11}=0$, $a_{12}=0$, $a_{13}=0$, $a_{21}=0$, $a_{22}=0$, and $a_{23}=0$.

Solution 2: The message 3 includes a first information element, where the first information element includes the data of the UE 3, and a second information element, where the second information element includes three linear combinations constituted by the data of the UE 1, the data of the UE 2, and the data of the UE 3. The message 3 further includes a third information element, where the third information element includes indication information, or the first information element includes indication information, or the second information element includes indication information.

For specific content of the linear combinations and indication information, refer to Solution 1.

It should be understood that, when the message 3 does not include data to be retransmitted, but includes only the data of the UE 3, the first information element and the second information element have the same content, which is the data of the UE 3.

In addition, the linear combination manners mentioned in Solution 1 and Solution 2 are merely examples, and are not intended to limit this application. In addition, for an encoding scheme of the message 4, refer to the encoding schemes of the message 3. Details are not described herein again.

For the foregoing example 3, retransmission queues maintained by the UE 1 to the UE 5 respectively are described with reference to examples.

The message 1 includes the data of the UE 1, and after the UE 1 broadcasts the message 1, the UE 2 has not received the message 1. In this case, the retransmission queue of the UE 1 includes the data of the UE 1, the retransmission queue of the UE 2 is empty, the retransmission queue of the UE 3 includes the data of the UE 1, and the retransmission queue of the UE 4 includes the data of the UE 1.

The message 2 includes the data of the UE 2, and after the UE 2 broadcasts the message 2, the UE 5 has not received the message 2. In this case, the retransmission queue of the UE 1 includes the data of the UE 1 and the data of the UE 2 (that is, the data of the UE 2 is included), the retransmission queue of the UE 2 includes the data of the UE 2, the retransmission queue of the UE 3 includes the data of the UE 1 and the data of the UE 2, the retransmission queue of the UE 4 includes the data of the UE 1 and the data of the UE 2, and the retransmission queue of the UE 5 includes the data of the UE 1.

The message 3 includes the data of the UE 3, the data of the UE 1, and the data of the UE 2. After the UE 3 broadcasts the message 3, the UE 5 has not received the message 3. In this case, the retransmission queue of the UE 1 includes the data of the UE 2 and the data of the UE 3 (that is, the data of the UE 3 is included and the data of the UE 1 is deleted). Specifically, because the UE 2 does not broadcast a NACK message after the UE 3 broadcasts the message 3, it indicates that the UE 2 has successfully received the message 3, that is, the data of the UE 1 is successfully retransmitted. Therefore, the data of the UE 1 is deleted from the retransmission queues. Because the UE 5 has not received the message 3, it indicates that the data of the UE 2 fails to be retransmitted, and the data of the UE 3 fails to be initially transmitted. The retransmission queue of the UE 2 includes the data of the UE 2 and the data of the UE 3, the retransmission queue of the UE 3 includes the data of the UE 2 and the data of the UE 3, the retransmission queue of the UE 4 includes the data of the UE 2 and the data of the UE 3, and the retransmission queue of the UE 5 is empty.

The message 4 includes the data of the UE 4, the data of the UE 2, and the data of the UE 3. After the UE 4 broadcasts the message 4, the UE 5 does not broadcast a NACK message. This indicates that the UE 5 has successfully received the message 4, that is, the data of the UE 2 and the data of the UE 3 are successfully retransmitted. Therefore, the retransmission queues of the UE 1 to the UE 5 are empty, and no data needs to be retransmitted.

The message 5 includes the data of the UE 5. After the UE 5 broadcasts the message 5, the UE 5 has not received NACK messages broadcast by the UE 1 to the UE 4. Therefore, the retransmission queues of the UE 1 to the UE 5 are empty, and no data needs to be retransmitted.

It should be understood that, in the process of maintaining the retransmission queues, it is assumed that, after the UE 1 broadcasts the message 1, the UE 1 and the UE 4 to the UE 5 all successfully receive the NACK message broadcast by the UE 2. After the UE 2 broadcasts the message 2, the UE 1 to the UE 4 all successfully receive the NACK message broadcast by the UE 5. After the UE 3 broadcasts the message 4, the UE 1 to the UE 4 all successfully receive the NACK message broadcast by the UE 5. Therefore, each of the UEs can accurately maintain its own retransmission queue, and include, based on the retransmission queue maintained by the UE, data to be retransmitted in a broadcast message.

Example 4: A multicast group includes UE_1 to UE_N, and the UE_1 to the UE_N broadcast messages in a numerical order. The following describes, by using UE_n as an example, how the UE_n in the UE_1 to the UE_N maintains a retransmission queue and encoding schemes of a message n.

Before the UE_n broadcasts the message n, the UE_n determines that data respectively corresponding to k UEs needs to be retransmitted, where the k UEs are k UEs in the UE_1 to UE_n−1, $2 \leq n \leq N$, and n, k, and N are positive integers. The UE_n broadcasts the message n, where the message n includes data of the UE_n and data respectively corresponding to the k UEs respectively, that is, the UE_n retransmits the data respectively corresponding to the k UEs for the k UEs in the UE_1 to the UE_n−1.

Specifically, the UE_n determines, based on a retransmission queue of the UE_n, that the data respectively corresponding to the k UEs needs to be retransmitted.

The following describes, by using UE_i as an example, how the UE_n determines, based on the retransmission queue of the UE_n, that data corresponding to the UE_i needs to be retransmitted, where the UE_i is any UE in the k UEs, and i is an integer.

The UE_n receives a message i broadcast by the UE_i, where the message i includes data of the UE_i. The UE_n receives a reception failure message broadcast by at least one UE for the message i. The UE_n updates the retransmission queue, where the updated retransmission queue includes the data corresponding to the UE_i.

Figure 4:
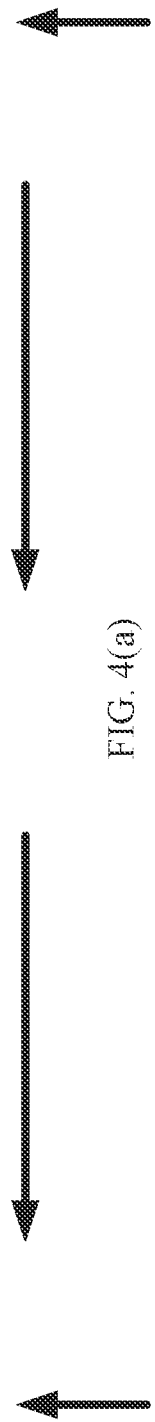
FIG. 4(a) and FIG. 4(b) are a schematic diagram of a retransmission queue according to this application.

Further, before the UE_n updates the retransmission queue, if the UE_n determines that a quantity of data stored in the retransmission queue reaches an upper limit of the quantity of data stored in the retransmission queue, the UE_n updates the retransmission queue, deletes earliest data included in the retransmission queue, and includes the data corresponding to the UE_i, as shown in FIG. 4(a) and FIG. 4(b). When the UE_1 to the UE_N broadcast messages in turn in a plurality of rounds, retransmission queues respectively corresponding to the UE_1 to the UE_N are cleared only when the last round ends, and are not cleared in any one of other rounds. When the UE_1 to the UE_N broadcast messages in turn in only one round, the retransmission queues respectively corresponding to the UE_1 to the UE_N are cleared after the UE_N broadcasts a message N.

In addition, in a possible design, the UE_N may not send the message N but only retransmit data. In another possible design, the UE_N sends the message N, a resource for retransmitting the message N is configured for the UE_N, the UE_N may retransmit the sent message N, and no resources for retransmitting the message N is configured for other UEs.

If i=n−1, the UE_n determines, based on the retransmission queue of the UE_n, that the data corresponding to the UE_i needs to be retransmitted.

If i<n−1, after the UE_n receives a reception failure message broadcast by at least one UE for the message i, the UE_n receives at least one message of a message i+1 to a message n−1 broadcast by UE_i+1 to the UE_n−1 respectively, and the at least one message includes the data of the UE_i. The UE_n receives a reception failure message from at least one UE in the at least one UE for a message including the data of the UE_i, that is, the UE_n determines that there is UE that has not received the data of the UE_i even if another UE has retransmitted the data of the UE_i. Therefore, the UE_n determines that the data of the UE_i needs to be retransmitted. If i<n−1, after the UE_n receives a reception failure message broadcast by at least one UE for the message i, the UE_n receives at least one message of a message i+1 to a message n−1 broadcast by the UE_i+1 to the UE_n−1 respectively, and the at least one message includes the data of the UE_i. The UE_n has not received a reception failure message from any UE in the at least one UE for a message including the data of the UE_i, that is, the UE_n determines that another UE has retransmitted the data of the UE_i and all the UEs have received the data of the UE_i. Therefore, the UE_n determines that the data of the UE_i does not need to be retransmitted, the UE_n updates the retransmission queue, where the updated retransmission queue does not include the data corresponding to the UE_i.

The encoding schemes of the message n may include the following two types.

Solution 1: The message n includes a first information element.

The first information element includes k+1 linear combinations constituted by the data of the UE_n and the data respectively corresponding to the k UEs, and coefficient vectors of the k+1 linear combinations are linearly independent of each other.

The message n further includes a second information element, where the second information element includes indication information, or the first information element includes indication information. The indication information includes at least one type of the following: location information of k time-frequency resources or identifiers of the k UEs, and an $i^{th}$ time-frequency resource in the k time-frequency resources is a time-frequency resource occupied when the data corresponding to the UE_i is broadcast for the first time. In addition, the indication information further includes at least one of a value k, an index of a coefficient matrix, or a coefficient matrix. The coefficient matrix is determined based on the coefficient vectors of the k+1 linear combinations, and the coefficient matrix is for parsing the message n.

The message n may be represented as $$\begin{pmatrix} m_n \\ C_1 \\ C_2 \\ \dots \\ C_k \end{pmatrix},$$

where $m_n$ represents the data of the UE_n, $C_1$ to $C_k$ represents k linear combinations of the data of the UE_n and the data respectively corresponding to the k UEs, where $m_1$ to $m_k$ respectively correspond to the data corresponding to the k UEs.

$$A = \begin{pmatrix} 1 & 0 & \dots & 0 \\ a_{1,1} & a_{1,2} & \dots & a_{1,k+1} \\ a_{2,1} & a_{2,2} & \dots & a_{2,k+1} \\ \vdots & \vdots & \ddots & \vdots \\ a_{k-1,1} & a_{k-1,2} & \dots & a_{k-1,k+1} \\ a_{k,1} & a_{k,2} & \dots & a_{k,k+1} \end{pmatrix}, \text{ and}$$

$$\begin{pmatrix} m_n \\ m_k \\ m_{k-1} \\ \dots \\ m_1 \end{pmatrix} = A^{-1} \begin{pmatrix} m_n \\ C_1 \\ C_2 \\ \dots \\ C_k \end{pmatrix}$$

Solution 1: The message n includes a first information element and a second information element.

The first information element includes the data of the UE_n, and the second information element includes k+1 linear combinations constituted by the data of the UE_n and the data respectively corresponding to the k UEs, and coefficient vectors of the k+1 linear combinations are linearly independent of each other.

The message n further includes a third information element, where the third information element includes indication information, or the second information element includes indication information, or the first information element includes indication information. The indication information includes at least one type of the following: location information of k time-frequency resources or identifiers of the k UEs, and an $i^{th}$ time-frequency resource in the k time-frequency resources is a time-frequency resource occupied when the data corresponding to the UE_i is broadcast for the first time. In addition, the indication information further includes at least one of a value k, an index of a coefficient matrix, or a coefficient matrix. The coefficient matrix is determined based on the coefficient vectors of the k+1 linear combinations, and the coefficient matrix is for parsing the message n.

Figure 5:
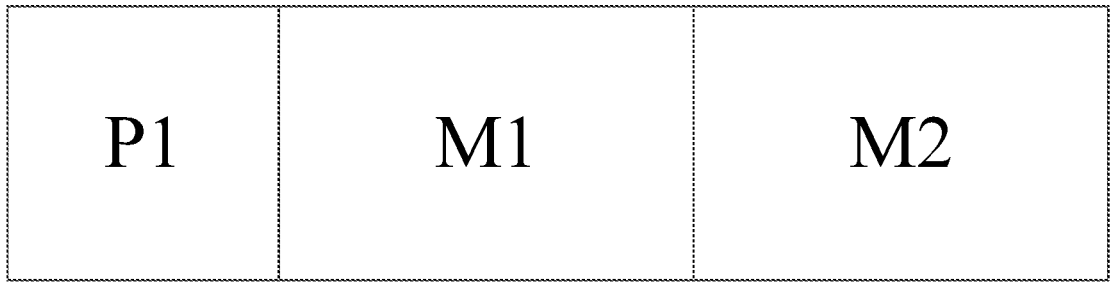
FIG. 5 is a schematic diagram of a structure of a message n according to this application.

FIG. 5 is an example of a message structure of the message n that includes three information elements. The three information elements are P1, M1, and M2. P1 may be used by the UE_n to feed back a reception failure message and/or indication information for a message, M1 represents a first information element, and M2 represents a second information element. When the message n includes only initially transmitted data of the UE_n, the first information element includes the data of the UE_n, and the second information element includes the data of the UE_n. When the message n includes the initially transmitted data of the UE_n and data to be retransmitted, the first information element includes the data of the UE_n, and the second information element includes the k+1 linear combinations constituted by the data of the UE_n and data respectively corresponding to k UEs. Messages sent in this manner have a same length, and setting of a system can be simplified.

It should be understood that the message structure of the message n shown in FIG. 5 is merely an example, and does not constitute any limitation on this application. The message structure of the message n may alternatively be in another form. For example, the message n may include only one information element, or two information elements, or more information elements. In addition, a linear combination that is in the message n and that is constituted by the data of the UE_n and the data respectively corresponding to the k UEs may alternatively be in another form. This is not limited in this application either.

Embodiment 2

Figure 6:
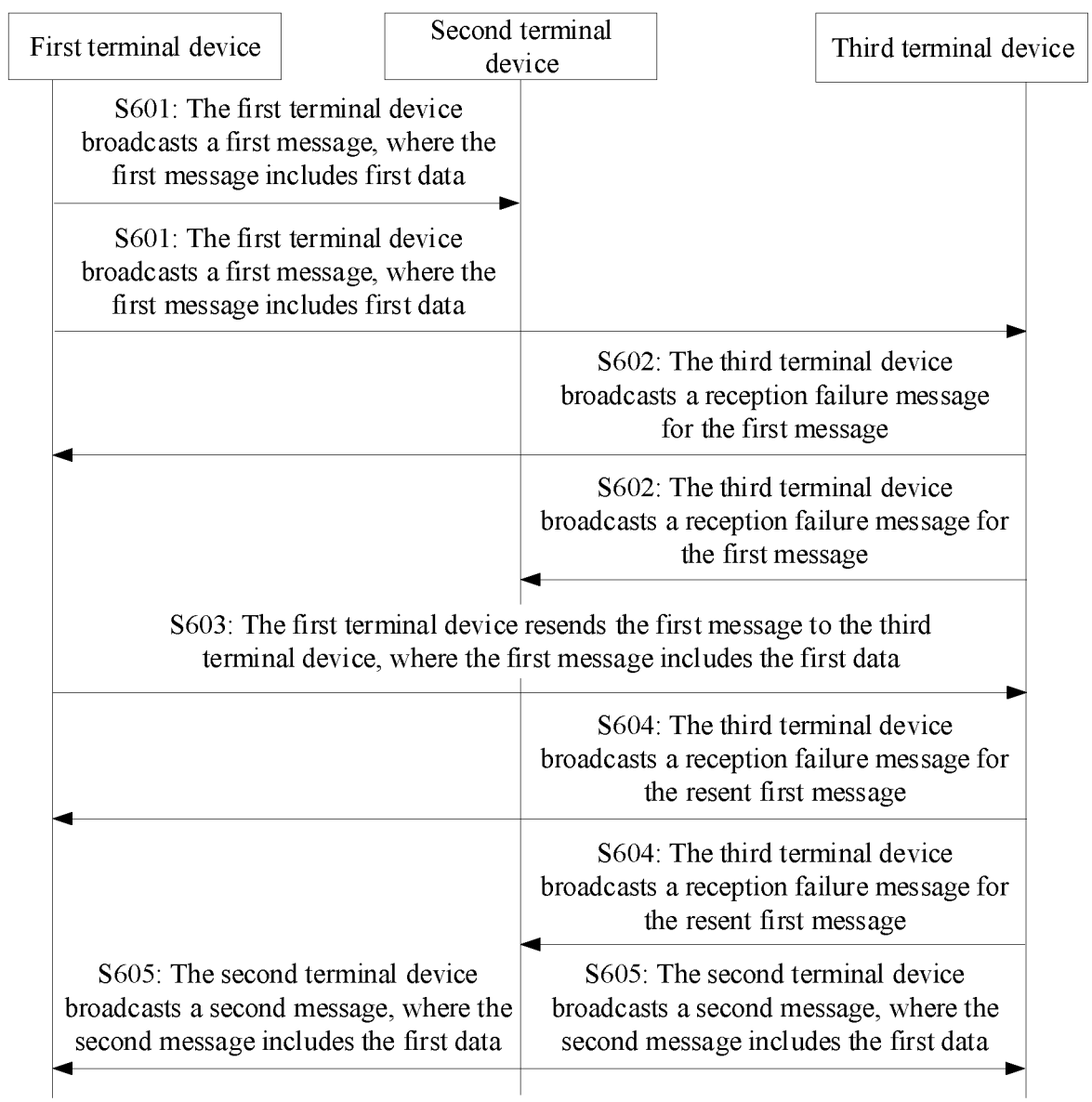
FIG. 6 is a second overview flowchart of a message transmission method according to this application.

As shown in FIG. 6, an embodiment of this application provides a message transmission method. The method includes the following steps.

S601: A first terminal device broadcasts a first message, where the first message includes first data. The first data is data initially transmitted by the first terminal device. A second terminal device receives the first message broadcast by the first terminal device. A third terminal device fails to receive the first message.

S602: The third terminal device broadcasts a reception failure message for the first message. Accordingly, the first terminal device receives the reception failure message broadcast by the third terminal device for the first message, and the second terminal device receives the reception failure message broadcast by the third terminal device for the first message.

S603: The first terminal device resends the first message to the third terminal device, where the first message includes the first data.

S604: The third terminal device broadcasts a reception failure message for the resent first message. Accordingly, the first terminal device receives the reception failure message broadcast by the third terminal device for the resent first message, and the second terminal device receives the reception failure message broadcast by the third terminal device for the resent first message.

S605: The second terminal device broadcasts a second message, where the second message includes the first data. Accordingly, the third terminal device receives the second message broadcast by the second terminal device, and the first terminal device receives the second message broadcast by the second terminal device.

In a possible design, the second message further includes second data. The second data is data initially transmitted by the second terminal device. The second message may be two linear combinations constituted by the first data and the second data.

In the foregoing method, the first terminal device may retransmit the first message for one or more times. If the first terminal device fails to retransmit the first message, the second terminal device may also retransmit the first data using the second message. If the first terminal device successfully retransmits the first message, the second terminal device may not need to retransmit the first data.

A difference between Embodiment 2 and Embodiment 1 lies in that, when a terminal device determines that there is another terminal device that has not received a message broadcast by the terminal device, the terminal device may initiate retransmission for one or more times. If the another terminal device still has not received the message after retransmission, another terminal device may retransmit the message.

Embodiment 3

Figure 7:
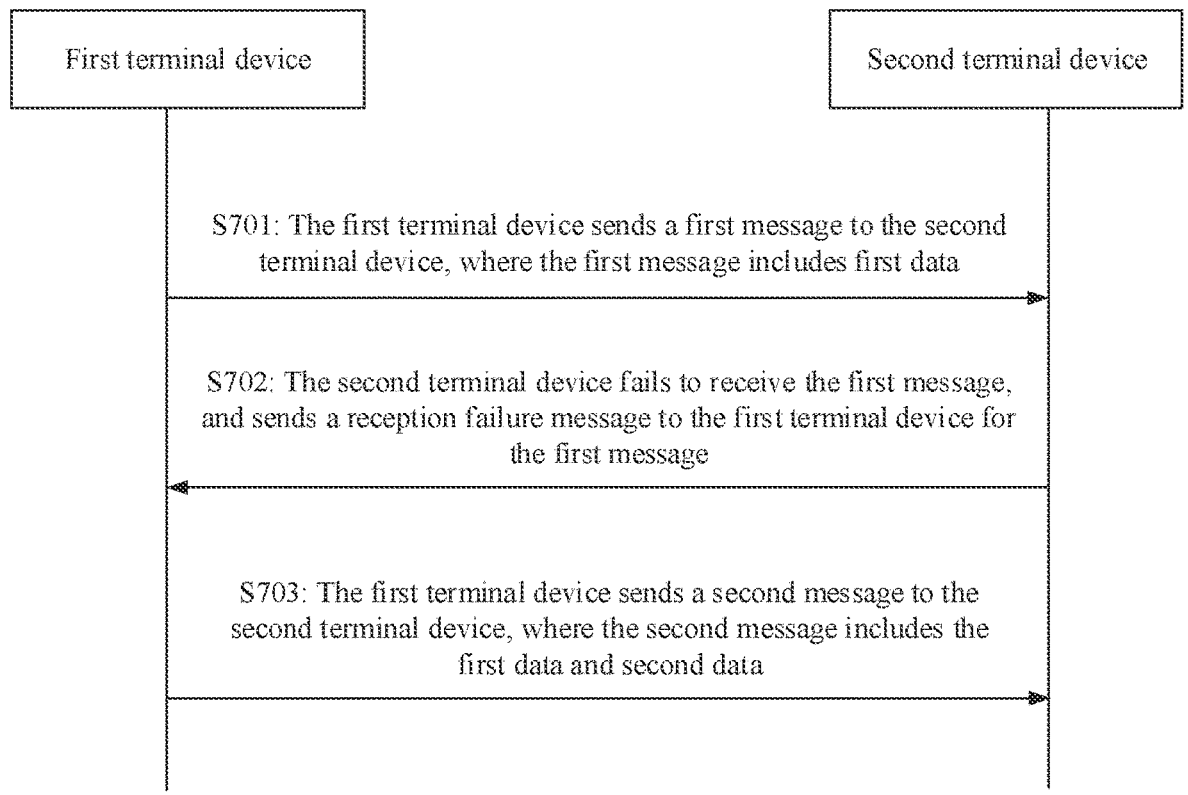
FIG. 7 is a third overview flowchart of a message transmission method according to this application.

As shown in FIG. 7, an embodiment of this application provides a message transmission method. The method includes the following steps.

S701: A first terminal device sends a first message to a second terminal device, where the first message includes first data. The first data is the first piece of data initially transmitted by the first terminal device.

S702: The second terminal device fails to receive the first message, and sends a reception failure message to the first terminal device for the first message.

S703: The first terminal device sends a second message to the second terminal device, where the second message includes the first data and second data. The second data is the second piece of data initially transmitted by the first terminal device.

According to the foregoing method, the first terminal device may send initially transmitted data while retransmitting data for the second terminal device. Therefore, resource utilization can be improved.

For example, the first terminal device may encode the second message using the message encoding scheme provided in the foregoing example 2 or example 3. Repeated descriptions are not provided.

In the foregoing embodiments of this application, to implement the foregoing functions, a terminal device includes a corresponding hardware structure and/or software module for performing the functions. A person skilled in the art should be easily aware that, with reference to units and algorithm steps in the examples described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 8:
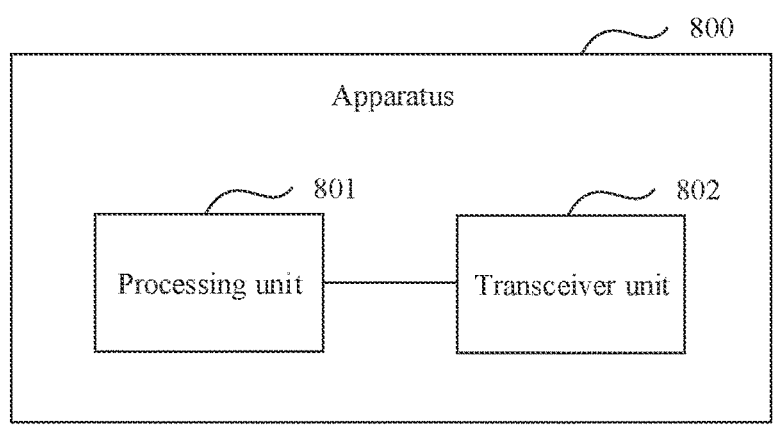
FIG. 8 is a first schematic diagram of a structure of an apparatus according to this application.

Same as the foregoing idea, as shown in FIG. 8, an embodiment of this application further provides an apparatus 800. The apparatus 800 includes a transceiver unit 802 and a processing unit 801.

In an example, the apparatus 800 is configured to implement functions of the terminal device in the method according to any one of the foregoing embodiments. The apparatus may be a terminal device, or may be an apparatus in the terminal device, such as a chip system.

The processing unit 801 invokes the transceiver unit 802 to receive a first message, where the first message is a broadcast message from a first terminal device, and the first message includes first data; receive a reception failure message for the first message, where the reception failure message for the first message is a broadcast message from a third terminal device; and broadcast a second message, where the second message includes the first data.

In an example, the apparatus 800 is configured to implement functions of the terminal device in the method according to any one of the foregoing embodiments. The apparatus may be a terminal device, or may be an apparatus in the terminal device, such as a chip system.

The processing unit 801 invokes the transceiver unit 802 to broadcast a reception failure message for a first message, where the first message is a broadcast message from a first terminal device, and the first message includes first data; and receive a second message, where the second message is a broadcast message from a second terminal device, and the second message includes the first data.

In an example, the apparatus 800 is configured to implement functions of the terminal device in the method according to any one of the foregoing embodiments. The apparatus may be a terminal device, or may be an apparatus in the terminal device, such as a chip system.

The processing unit 801 invokes the transceiver unit 802 to send a first message to a second terminal device, where the first message includes first data; receive a reception failure message from the second terminal device for the first message; and send a second message to the second terminal device, where the second message includes the first data and second data.

In an example, the apparatus 800 is configured to implement functions of the terminal device in the method according to any one of the foregoing embodiments. The apparatus may be a terminal device, or may be an apparatus in the terminal device, such as a chip system.

The processing unit 801 invokes the transceiver unit 802 to send a reception failure message to a first terminal device for a first message, where the first message is a message from the first terminal device, and the first message includes first data; and receive a second message from the first terminal device, where the second message includes the first data and second data.

For specific execution processes of the processing unit 801 and the transceiver unit 802, refer to the descriptions in the foregoing method embodiments. Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

As another optional variation, the apparatus may be a chip system. In this embodiment of this application, the chip system may include a chip, or may include a chip and another discrete component. For example, the apparatus includes a processor and an interface circuit. The interface circuit is configured to receive code instructions and transmit the code instructions to the processor. The processor runs the code instructions, to perform the method according to any one of the foregoing embodiments. The processor implements functions of the processing unit 801, and the interface circuit implements functions of the transceiver unit 802.

Figure 9:
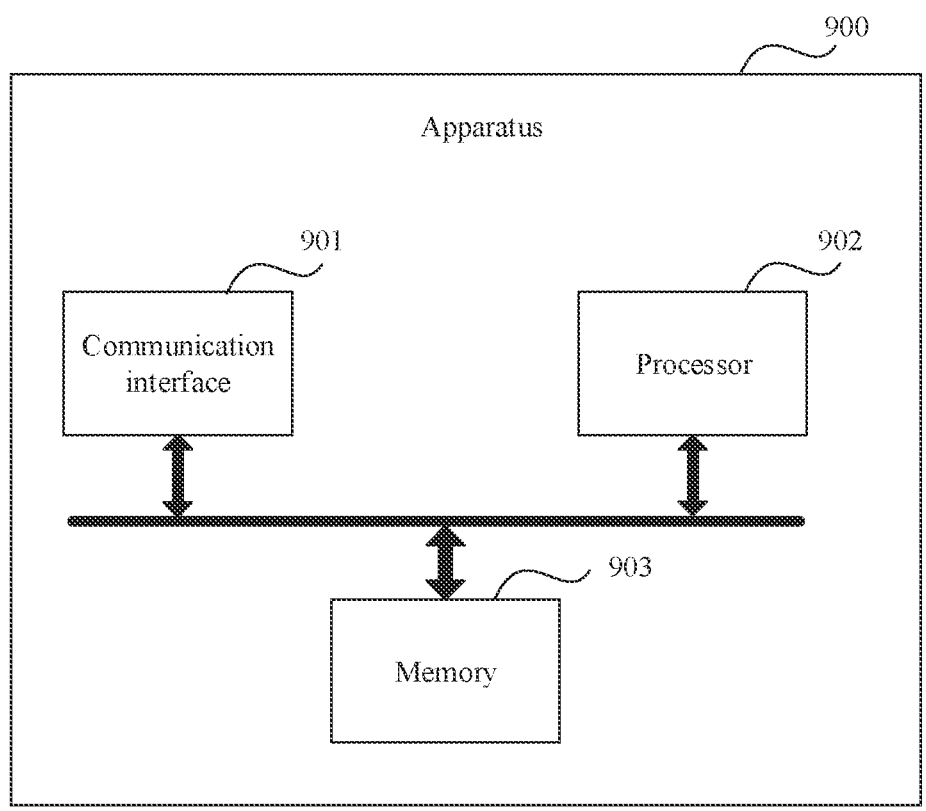
FIG. 9 is a second schematic diagram of a structure of an apparatus according to this application.

Same as the foregoing idea, as shown in FIG. 9, an embodiment of this application further provides an apparatus 900. The apparatus 900 includes a communication interface 901, at least one processor 902, and at least one memory 903. The communication interface 901 is configured to communicate with another device via a transmission medium, so that an apparatus in the apparatus 900 can communicate with the another device. The memory 903 is configured to store a computer program. The processor 902 invokes the computer program stored in the memory 903, to send and receive data through the communication interface 901, to perform the method according to any one of the foregoing embodiments.

For example, when the apparatus is a terminal device, the memory 903 is configured to store a computer program, and the processor 902 invokes the computer program stored in the memory 903 to perform, through the communication interface 901, the method performed by the terminal device according to any one of the foregoing embodiments.

In this embodiment of this application, the communication interface 901 may be a transceiver, a circuit, a bus, a module, or another type of communication interface. The processor 902 may be a general-purpose processor, a digital signal processor, an application-specific integrated circuit, a field programmable gate array or another programmable logic device, a discrete gate or transistor logic device, or a discrete hardware component, and may implement or perform the method, steps, and logical block diagrams disclosed in embodiments of this application. The general-purpose processor may be a microprocessor, any conventional processor, or the like. The steps of the method disclosed with reference to embodiments of this application may be directly performed by a hardware processor, or may be performed by using a combination of hardware in the processor and a software module. The memory 903 may be a nonvolatile memory, for example, a hard disk drive (hard disk drive, HDD) or a solid-state drive (solid-state drive, SSD), or may be a volatile memory (volatile memory), for example, a random access memory (random-access memory, RAM). The memory is any other medium that can carry or store expected program code in a form of an instruction structure or a data structure and that can be accessed by a computer, but is not limited thereto. The memory in this embodiment of this application may alternatively be a circuit or any other apparatus that can implement a storage function. The memory 903 is coupled to the processor 902. Coupling in this embodiment of this application is indirect coupling or a communication connection between apparatuses, units, or modules, may be in an electrical form, a mechanical form, or another form, and is used for information exchange between apparatuses, units, or modules. In another implementation, the memory 903 may alternatively be located outside the apparatus 900. The processor 902 may operate in collaboration with the memory 903. The processor 902 may execute program instructions stored in the memory 903. At least one of the at least one memory 903 may alternatively be included in the processor 902. In this embodiment of this application, a specific connection medium between the communication interface 901, the processor 902, and the memory 903 is not limited. For example, in this embodiment of this application, the memory 903, the processor 902, and the communication interface 901 may be connected through a bus in FIG. 9. The bus may be classified into an address bus, a data bus, a control bus, or the like.

It may be understood that the apparatus in the embodiment shown in FIG. 8 may be implemented by the apparatus 900 shown in FIG. 9. Specifically, the processing unit 801 may be implemented by the processor 902, and the transceiver unit 802 may be implemented by the communication interface 901.

An embodiment of this application further provides a computer-readable storage medium. The computer-readable storage medium stores a computer program. When the computer program is run on a computer, the computer is enabled to perform the method according to any one of the foregoing embodiments.

The method according to any one of the foregoing embodiments of this application may be completely or partially implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedures or functions according to embodiments of the present invention are all or partially generated. The computer may be a general-purpose computer, a dedicated computer, a computer network, a network device, user equipment, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid state disk (Solid State Disk, SSD)), or the like.

The foregoing embodiments are merely used to describe the technical solutions of this application in detail. The descriptions of the foregoing embodiments are merely intended to help understand the method according to any one of the foregoing embodiments of the present invention, and shall not be construed as any limitation on embodiments of the present invention. Variations or replacements readily figured out by a person skilled in the art shall fall within the protection scope of embodiments of the present invention.

What is claimed is:

1. A method, wherein the method comprises:
    receiving, by a second terminal device, a first message, wherein the first message is a broadcast message from a first terminal device, and the first message comprises first data;
    receiving, by the second terminal device, a reception failure message for the first message, wherein the reception failure message for the first message is a broadcast message from a third terminal device; and
    broadcasting, by the second terminal device, a second message, wherein the second message comprises an initial transmission of second data originated from the second terminal device and a retransmission of the first data received by the second terminal device from the first terminal device, and wherein the second message comprises a linear combination constituted by the first data for the retransmission and the second data for the initial transmission based on a coefficient matrix, wherein the coefficient matrix comprises a first coefficient vector corresponding to the initial transmission and a second coefficient vector corresponding to the retransmission.

2. The method according to claim 1, wherein the first terminal device, the second terminal device, and the third terminal device belong to a same multicast group.

3. The method according to claim 1, wherein the method further comprises:
    receiving, by the second terminal device, a fourth message, wherein the fourth message is a broadcast message from a fourth terminal device, and the fourth message comprises the first data; and
    receiving, by the second terminal device, a reception failure message for the fourth message, wherein the reception failure message for the fourth message is a broadcast message from the third terminal device.

4. The method according to claim 1, wherein the second coefficient vector comprises a first coefficient associated with the initial transmission and a second coefficient associated with the retransmission.

5. The method according to claim 4, wherein the second coefficient in the second coefficient vector is associated with the retransmission of the first data received by the second terminal device from the first terminal device, and the second coefficient vector further comprises a third coefficient associated with a retransmission of data received by the second terminal device from a third terminal device.

6. The method according to claim 1, wherein the second message further comprises a matrix index that indicates which coefficient matrix of a plurality of coefficient matrices is used to perform the linear combination of the first data and the second data.

7. The method according to claim 1, wherein the second message comprises the coefficient matrix.

8. A method, wherein the method comprises:
    broadcasting, by a third terminal device, a reception failure message for a first message, wherein the first message is a broadcast message from a first terminal device, and the first message comprises first data; and
    receiving, by the third terminal device, a second message, wherein the second message is a broadcast message from a second terminal device, and the second message comprises an initial transmission of second data originated from the second terminal device and a retransmission of the first data received by the second terminal device from the first terminal device, and wherein the second message comprises a linear combination constituted by the first data for the retransmission and the second data for the initial transmission based on a coefficient matrix, wherein the coefficient matrix comprises a first coefficient vector corresponding to the initial transmission and a second coefficient vector corresponding to the retransmission.

9. The method according to claim 8, wherein the first terminal device, the second terminal device, and the third terminal device belong to a same multicast group.

10. The method according to claim 8, wherein the method further comprises:
    broadcasting, by the third terminal device, a reception failure message for the second message; and
    receiving, by the third terminal device, a fifth message, wherein the fifth message is a broadcast message from a fifth terminal device, and the fifth message comprises the first data.

11. An apparatus, comprising:
    one or more processors; and
    one or more memories storing computer-executable instructions for execution by the one or more processors to cause the apparatus to:
    receive a first message, wherein the first message is a broadcast message from a first terminal device, and the first message comprises first data;
    receive a reception failure message for the first message, wherein the reception failure message for the first message is a broadcast message from a third terminal device; and
    broadcast a second message, wherein the second message comprises an initial transmission of second data originated from the apparatus and a retransmission of the first data received by the apparatus from the first terminal device, and wherein the second message comprises a linear combination constituted by the first data for the retransmission and the second data for the initial transmission based on a coefficient matrix, wherein the coefficient matrix comprises a first coefficient vector corresponding to the initial transmission and a second coefficient vector corresponding to the retransmission.

12. The apparatus according to claim 11, wherein the first terminal device, the apparatus, and the third terminal device belong to a same multicast group.

13. The apparatus according to claim 11, wherein the computer-executable instructions, when executed by the one or more processors, further cause the apparatus to:
- receive a fourth message, wherein the fourth message is a broadcast message from a fourth terminal device, and the fourth message comprises the first data; and
- receive a reception failure message for the fourth message, wherein the reception failure message for the fourth message is a broadcast message from the third terminal device.

14. The apparatus according to claim 11, wherein the second coefficient vector comprises a first coefficient associated with the initial transmission and a second coefficient associated with the retransmission.

15. The apparatus according to claim 14, wherein the second coefficient in the second coefficient vector is associated with the retransmission of the first data received by the apparatus from the first terminal device, and the second coefficient vector further comprises a third coefficient associated with a retransmission of data received by the apparatus from a third terminal device.

16. The apparatus according to claim 11, wherein the second message further comprises a matrix index that indicates which coefficient matrix of a plurality of coefficient matrices is used to perform the linear combination of the first data and the second data.

17. The apparatus according to claim 11, wherein the second message comprises the coefficient matrix.

18. An apparatus, comprising:
- one or more processors; and
- one or more memories storing computer-executable instructions for execution by the one or more processors to cause the apparatus to:
- broadcast a reception failure message for a first message, wherein the first message is a broadcast message from a first terminal device, and the first message comprises first data; and
- receive a second message, wherein the second message is a broadcast message from a second terminal device, and the second message comprises an initial transmission of second data originated from the second terminal device and a retransmission of the first data received by the second terminal device from the first terminal device, and wherein the second message comprises a linear combination constituted by the first data for the retransmission and the second data for the initial transmission based on a coefficient matrix, wherein the coefficient matrix comprises a first coefficient vector corresponding to the initial transmission and a second coefficient vector corresponding to the retransmission.

19. The apparatus according to claim 18, wherein the first terminal device, the second terminal device, and the apparatus belong to a same multicast group.

20. The apparatus according to claim 18, wherein the computer-executable instructions, when executed by the one or more processors further cause the apparatus to:
- broadcast a reception failure message for the second message; and
- receive a fifth message, wherein the fifth message is a broadcast message from a fifth terminal device, and the fifth message comprises the first data.

* * * * *